United States Patent Office 3,135,712
Patented June 2, 1964

3,135,712
COATING COMPOSITION COMBINING BLOWN HYDROCARBON DRYING OILS AND AMINE-ALDEHYDE RESINS
Theodore A. Neuhaus, Rocky River, and Harry J. Kiefer, Cleveland, Ohio, assignors to The Glidden Company, Cleveland, Ohio, a corporation of Ohio
No Drawing. Filed June 23, 1955, Ser. No. 517,634
9 Claims. (Cl. 260—33.6)

This invention relates to a coating composition particularly adapted for use as a sanitary coating for cans and other containers in which edible products are packed. More specifically, it relates to a blended coating employing a major amount of oxidized hydrocarbon drying oil and a minor amount of at least one amine-aldehyde resin, such as urea-aldehyde, melamine-aldehyde, bis amino-triazine-aldehyde and triallylcyanurate resins.

Briefly neither oxidized hydrocarbon oils alone nor the amine-aldehyde resins alone form satisfactory sanitary can coatings, but we have discovered that their combinations have expected merits for this use, which merits are described more fully hereinafter. Moreover, we have found that the blended coating materials have merits for use on metal articles other than cans, e.g., as wire-coatings, as drum, tank car and tank wagon linings, as linings for pipes, and as general protective enamel coatings for metal, especially for ferrous metal.

Accordingly, one object of this invention is to provide a novel blended coating composition using a major amount of oxidized hydrocarbon drying oil and a minor amount of amine-aldehyde solvent-soluble, heat-convertible film-forming resins.

A further object is to provide novel, improved sanitary coatings for metal containers.

Still another object is to provide novel electric conductors coating with our improved coating compositions.

Another object is to provide a durable, protective coated and/or lining material for drums, tanks, pipes, etc.

These and other objects will be apparent from the following description of the invention.

The copending joint application of T. A. Neuhaus and H. J. Kiefer, Serial No. 513,606, filed June 6, 1955, now abandoned, discloses our discovery that oxidized hydrocarbon drying oils which have been blown in the presence of moderately strong solvents, such as hydrocarbons and/or oxygenated organic solvents having a kauri butanol value of at least 40, to an oxygen content of 6% or more are compatible with a variety of conventional film-formers, among which are the amine-aldehyde resins mentioned above. We also discovered that blends of the amine-aldehyde resins with the oxidized oils having at least about 8% of oxygen unexpectedly lower the curing temperature at which a film of desired hardness can be secured and give more useful films at the curing temperatures heretofore considered optimum for the oxidized drying oils alone. We further found that the blends give increased gloss in pigmented systems and give improved fracture resistance, abrasion resistance, chemical resistance and moisture resistance when applied to metallic substrates, especially to iron, tinned-iron and other ferrous materials.

As noted previously, our improved coating compositions are blends of the two identified classes of film-forming materials in appropriate compatible solvents. The amine-aldehyde resins are generally present in amount less than 50% of the total film-forming solids, by weight, and preferably amounts to 15–30%. For can coatings and like sanitary coatings, optimum results appear to be secured with 15–20% of the amine-aldehyde resins, while 25–30% appears optimum for enamels. The oxidized drying oil constitutes the remainder of the film-forming solids. These two ingredients will now be discussed separately under their appropriate headings.

THE OXIDIZED OIL

The unoxidized hydrocarbon drying oils, such as polybutadiene and butadiene-styrene copolymer oils are incompatible with amine-aldehyde resins until oxidized, as by a blowing or equivalent treatment with air or other free oxygen-containing gas. To be rendered compatible with the amine-aldehyde resins, the drying oils should be oxidized sufficiently to contain at least about 8% of combined oxygen but may contain as much as 20–22% of oxygen. To incorporate such amounts of oxygen without gelling the oil, it is necessary to keep the oil dissolved in appropriate solvents, especially after the oxygen content has reached about 5–6%. Organic solvents or solvent mixtures having a kauri butanol value of at least 40 are employed for this purpose, in amounts corresponding generally to a solids content between about 25% and 50%. We prefer to blow the oils at a solids content of about 35%, with addition of solvent(s) from time to time during the blowing if it is desired to keep the solids content fairly constant.

Blowing can be done in various types of equipment suited to the purpose and can be preformed at temperatures between room temperature and about 280° F. We prefer temperatures between about 200° F. and 260° F. The time element involved in blowing to a desired oxygen content varies from a few hours to several days and depends on many factors which are discussed fully in the copending joint application identified above.

The hydrocarbon drying oil so oxidized can be any of a variety of such oils, for example, polybutadiene, butadiene-styrene, butadiene-acrylonitrile, etc. In general, any oily polymer prepared with a $C_4$–$C_6$ conjugated diolefin and having radicals of the latter in the chemical structure of the polymer can be used as long as the diolefin amounts to 60%–100%. When copolymers are used, one or more monocyclic vinyl aromatic compounds can be used in amounts from 0–40%. Among the diolefins, we presently prefer butadiene and among the monocyclic vinyl aromatics, we prefer styrene and the methyl-and/or ethyl-nuclearly-substituted styrenes Any of the oily polymers described in the copending joint application identified above, however, are satisfactory for our purposes in the present invention, and we contemplate their use herein especially after they have been oxidized to contain 8–22% of combined oxygen by weight on the oily polymer. The entire disclosure of the said copending application of Neuhaus and Kiefer is here incorporated by reference. Typical syntheses of butadiene-polymer drying oils are here given.

SYNTHESIS METHOD A

For example, 100 parts of butadiene-1,3, 50 parts of straight run mineral spirits boiling between 150 and 200° C. (Varsol), 3 parts t-butyl hydroperoxide (60% pure) and 0.75 part of diisopropyl xanthogen disulfide are heated in a closed reactor at about 90° C. for 40 hours, whereupon the residual pressure is released and unreacted butadiene is allowed to volatilize from the polymerized mixture at 70° C. The resulting product, which is a clear, water-white solution, consists typically of about 60 parts of oily polymer of butadiene, about 4 parts of butadiene dimer, plus solvent and some t-butyl alcohol. This solution of polymer is then preferably fractionated to remove the dimer and usually adjusted to 50% non-volatile matter content with mineral spirits. The non-volatile constituent, which is the oily polymer of butadiene, has a molecular weight between 1,000 and 10,000, preferably between 2,000 and 5,000. It will be understood, of course, that the foregoing procedure is only illustrative and that it can be modified in many ways, particularly as described in U.S. Patent No. 2,586,594 of Arundale et al. which describes alternative monomers, catalysts, reaction diluents, polymerization modifiers, suitable ranges of proportions of the various ingredients, suitable ranges of polymerization conditions, etc.

SYNTHESIS METHOD B

An alternative polymerization method using sodium as catalyst is illustrated as follows: 80 parts of butadiene-1,3, 20 parts of styrene, 200 parts of straight run mineral spirits boiling between 150 and 200° C., 40 parts of dioxane, 0.2 part of isopropanol and 1.5 parts of finely dispersed sodium are heated at about 50° C. in a closed reactor provided with an agitator. Complete conversion is obtained in about 4.5 hours whereupon the catalyst is destroyed by adding an excess of isopropanol to the polymerized charge. The crude product is cooled, neutralized with carbon dioxide or glacial acetic acid or other anhydrous organic acid and filtered. Instead of neutralizing the alcohol treated product, the acid may also be added directly to the crude product containing residual metallic sodium and the latter destroyed by the acid. The colorless filtrate is then fractionally distilled to remove the alcohol and modifiers such as dioxane. Finally, additional hydrocarbon solvent is preferably distilled off until a product containing about 50%–100% non-volatile matter is obtained.

Again it will be understood that the described sodium polymerization method may be varied considerably as by omitting the styrene co-reactant; or by adding the styrene only after the polymerization of butadiene monomer has begun; or dioxane may be replaced by 10 to 35 parts of another ether modifier having 3 to 8 carbon atoms, such as methyl ethyl ether, dibutyl ether or phenetole; or the modifier may be omitted altogether, especially when it is not essential to obtain a perfectly colorless product. Similarly, isopropanol is not necessary, though aliphatic alcohols of less than 6 carbon atoms generally have the beneficial effect of promoting the reaction when present in amounts ranging from about 2 to 50% based on the weight of sodium catalyst. Furthermore, the mineral spirits may be replaced by other inert hydrocarbon diluents boiling between about $-15°$ C. and 250° C., preferably between 60 and 200° C., e.g., butane, benzene, xylene, naphtha, cyclohexane and the like. The diluents are usually used in amounts ranging from 50 to 500 parts per 100 parts of monomer. The reaction temperature may vary between about 40° C. and 100° C., preferably around 65 to 85° C. As a catalyst, 0.1 to 10 parts of dispersed metallic sodium is used per 100 parts of monomers, sodium particle sizes below 100 microns being particularly effective.

THE AMINO-ALDEHYDE RESINS

Amino-aldehyde resins are a well-known class of polymers. The amino groups essential thereto are supplied by a variety of related compounds having as a characteristic common to the group possession of at least two functional amino groups, each of said groups being attached to a carbon atom having a double bond extending to another element of the compound selected from the group consisting of nitrogen, sulfur and oxygen. Included among the useful compounds are urea, thiourea, dicyandiamide, guanidine, melamine, melam, ammeline, thioammeline, bis-triazine (U.S. Pat. No. 2,653,143, here incorporated by reference), B-B' bis-thioammeline diethyl ether, 2,6-diamino-1,3-diazine, 5-methyl-2,6-diamino-1,3-diazine, 4-chloro-2,6-diamino-1,2-diazine and mixtures of said compounds. The preferred compounds of the group are urea, melamine and dicyandiamide. Some of the named group are included in the generic term "polyamino diazines" and "polyamino triazines."

Aldehydes which may be employed include acetaldehyde, benzaldehyde, butyraldehyde, formaldehyde, furfuraldehyde, and mixtures thereof, but the preferred aldehyde is formaldehyde. Other aldehydes such as crotonaldehyde are less commonly employed.

The source of the formaldehyde may be an aqueous solution, e.g., formalin, or may be one of its polymeric forms, e.g., paraformaldehyde, which yield formaldehyde under the conditions of the reaction.

The ratio of the amino compound to aldehyde in the reaction mixture may be varied as is known in the art depending upon the qualities desired in the final product. In general, the number of moles of aldehyde employed is based upon the number of reactive or functional amino groups in the selected amino compound. In the case of urea-formaldehyde condensations, as high as three moles of formaldehyde to one of urea may be employed, but it is preferable to use a somewhat lower amount, e.g., between 2.5 and 2 moles of formaldehyde per mole of urea. When the amino compound is of greater functionality, such as in melamine-formaldehyde condensations, it is generally desirable that the ratio of formaldehyde to melamine be between 6:1 and 3:1, although in a given condensation to obtain specific properties it may be desired to use ratios outside the limits above described.

By reference to the reactive amino groups, the molar ratios of aldehyde to amino groups has been found to be in the ratio of from 1:2 and 2:1 in the amino-aldehyde resinous compositions of present-day usage.

The amino compounds and aldehydes are preferably condensed together under alkaline conditions and then resinified under acidic conditions. The resin condensates described herein are to be employed in the protective coatings field and are to be used in solution in organic solvents, and it is, therefore, desirable if not essential that the amino-aldehyde condensation be carried out in the presence of alcohols to promote solvent solubility. It is believed that the amino-aldehyde polymers form ethers through the residual alkylol groups of the resin reacting with the alcohol to release water and form ethers.

While butyl alcohol is preferred, other alcohols are acceptable and are employed, including the alcohols from methyl alcohol through octadecanol, i.e., having from one to 18 carbon atoms. Branched chain alcohols are also useful, isobutyl alcohol being commonly used.

Amino-aldehyde resins are generally capable of further polymerization in the presence of heat, or heat and catalysts, to form solvent-insoluble, infusible products, and it is common practice in certain final application techniques to include acidic catalysts just prior to the application of heat in the curing step. The inclusion of catalysts does no harm in the present invention but is unnecessary. In this respect the commercial amine-aldehyde resins, some of which include conventional catalysts, can be used satisfactorily in preparing our blended coatings.

The disclosures of U.S. Patents 2,704,750, 2,628,234, 2,496,097, 2,290,133, 2,334,904, 2,451,153, 2,398,569 and 2,323,357 concerning the preparation of amine-aldehyde resins are incorporated by reference.

The following examples illustrate the best embodiments of the invention presently known to us.

*Examples 1–18*

Various portions of a copolymer butadiene (80%)-styrene (20%) drying oil prepared in the manner described in Synthesis B, above, were blown with air in the presence of solvent and of blowing catalysts to prepare different lots of blown oil having a range of oxygen contents. The following table identifies the various lots:

| Oil | Solvent | Percent $O_2$ | Blowing Catalyst | Viscosity at 50% NVM, poise | NVM, percent |
|---|---|---|---|---|---|
| I | Solvesso 100 [1] | 9.3 | Manganese | 4 | 50 |
| II | do | 9.58 | Iron | 44 | 50 |
| III | do | 9.78 | do | 11.5 | 50 |
| IV | do | 13.6 | do | 9.8 | 50 |
| V | TS-28-R [2] | 16.5 | do | 55 | 35.7 |

[1] KB value 98–100; boiling range 320–340° F.
[2] KB value 72–77; a solvent prepared and available commercially.

Oils III and V were blended with the 60% NVM commercial melamine resin solution Uformite MM 46 (a solvent-soluble melamine-formaldehyde product) in the proportions of 80% oil:20% MM 46 and 85% oil:15% MM 46. The viscosity stability of the blends is shown here:

| Example | Material | Poise Viscosity Original | Poise Viscosity 2 Weeks | NVM |
|---|---|---|---|---|
| 1 | Oil V | 9.8 | 11.7 | 35.7 |
| 2 | Oil V + 20% MM 46 | 3.5 | 8.8 | 38.8 |
| 3A | Oil V + 15% MM 46 | 4.2 | 12.9 | 38.1 |
| 3B | Oil III + n-Butanol | 6.8 | 8.4 | 50 |
| 3C | 3A + 20% MM 46 | 5.9 | 6.0 | 54.8 |
|  | 3A + 15% MM 46 | 5.9 | 6.3 | 54.5 |

Oils I–V were blended with 20% of Beetle Resin 227–8 (a butylated urea-formaldehyde resin solution, 50% NVM), with 20% of Uformite MM 46, and with 20% of the polyamino-triazine-aldehyde resin solution Uformite MX 61 (60% NVM). Films of the resulting blends on tinned-iron sheet were baked for indicated times (in minutes) at 300° F., and Sward hardness values were determined on the cured films with the following results.

| Example | Material | Sward Hardness in Baked Films | | | | |
|---|---|---|---|---|---|---|
|  |  | 10 Min. | 15 Min. | 20 Min. | 25 Min. | 30 Min. |
|  | Oil I |  | 22 | 25 | 31 | 35 |
| 4 | Oil I + Beetle |  | 12 | 14 | 16 | 22 |
| 5 | Oil I + MM 46 |  | 9 | 12 | 13 | 18 |
| 6 | Oil I + MX 61 |  | 12 | 17 | 21 | 20 |
|  | Oil II | 9 | 18 | 23 | 24 | 29 |
| 7 | Oil II + Beetle | 10 | 14 | 18 | 16 | 21 |
| 8 | Oil II + MM 46 | 13 | 16 | 18 | 19 | 26 |
| 9 | Oil II + MX 61 | 16 | 22 | 22 | 25 | 30 |
|  | Oil III | 12 | 18 | 23 | 28 | 35 |
| 10 | Oil III + Beetle | 9 | 12 | 13 | 16 | 19 |
| 11 | Oil III + MM 46 | 9 | 12 | 14 | 19 | 20 |
| 12 | Oil III + MX 61 | 15 | 18 | 22 | 22 | 26 |
|  | Oil IV | 17 | 24 | 29 | 34 | 37 |
| 13 | Oil IV + Beetle | 13 | 18 | 19 | 20 | 23 |
| 14 | Oil IV + MM 46 | 13 | 18 | 19 | 20 | 20 |
| 15 | Oil IV + MX 61 | 19 | 21 | 23 | 26 | 29 |
|  | Oil V | 29 | 35 | 43 | 50 | 44 |
| 16 | Oil V + Beetle | 26 | 30 | 34 | 35 | 36 |
| 17 | Oil V + MM 46 | 28 | 20 | 31 | 36 | 36 |
| 18 | Oil V + MX 61 | 35 | 39 | 39 | 46 | 44 |

The data show that while the oils by themselves cure to harder films than the various blends, the incorporation of the amine-aldehyde resins permits eminently useful hardness values to be secured.

Food pack tests using pumpkin and various meats in cans coated with cured films of the resin blends of Examples 4–18 were conducted to observe the effect of those foods on the durability resistance properties of the films. Pumpkin and meats were used because it is well known that these foods present about the most severe conditions normally encountered in the canning of foods. The cans used in these tests carried cured films about .30–.33 mils thick, and the curing of the films was effected by baking 12 minutes at 300° F. The results of the above and other tests indicated clearly that blends using blown oils containing between about 8.3% and 18% oxygen are well qualified for use as sanitary linings. Part of the tests were carried out using only partly-filled cans, thereby leaving an inordinately large head space. It was observed that optimum head space resistance to corrosion, stain, etc. was exhibited by resin blends which employed blown oils having 10% or more of oxygen therein.

Tests of the blended resins of Examples 4–18 for fracture resistance, abrasion resistance, and other mechanical properties were judged to be satisfactory in respect to the mechanical operations involved in the manufacture of cans from coated sheet stock.

*Example 19*

One hundred fifty-three parts of 37% formaldehyde solution (formalin) and 40 parts of paraformaldehyde were weighed into a 100 gallon reaction vessel equipped with a thermometer, agitator and reflux condenser and designed so that a vacuum of 50 mm. of mercury, or less, could be obtained within the vessel. The pH of the resultant mix was adjusted by the addition of small quantities of 10% caustic solution to a pH of 9.3. Following this adjustment 67.3 parts of urea was added and the mixture heated cautiously to 160° F., and held for one hour with agitation. Two hundred parts of n-butanol and 14 parts of xylene were added after the initial alkaline reaction and the pH was adjusted to 3.5 with phosphoric acid. The reaction mixture was brought to reflux and the water present was azeotropically removed.

After 2 hours of refluxing during which the organic solvent was returned to the reaction mixture, 67 additional parts of n-butanol was added and the distillation continued until the temperature of the reaction mass reached 226° F. N-butanol was removed slowly by further distillation until the mass reached 253° F., whereupon vacuum was drawn over the kettle and additional solvent recovered until the solids within the reaction mixture were approximately 67%. The vacuum was broken and the batch thinned with 67 parts of xylene. The yield was 274 pounds of resin of 46.8% non-volatile content having a viscosity of F(Gardner-Holdt) an acid number of 10.9 and pounds of solids per gallon of 8.45. When this resin was substituted for the Beetle resin of Examples 4, 7, 10, 13 and 16 and then tested in the same manners, it was found that comparable properties resulted.

*Example 20*

Sixty-three parts of melamine and 244 parts of formaldehyde solution (37%) are neutralized in a reaction vessel similar to that used in Example 19 and the pH is then increased to 8 with 5% sodium hydroxide solution. The temperature of the reactants is increased until reflux is started at about 212° F., refluxing continued for 30 minutes. Sufficient phosphoric acid is added to adjust the pH to between 3 and 4, and 400 parts of butyl alcohol and 25 parts of xylene are added. The heating is continued until the reflux condition is again established. The product is azeotropically distilled, the water removed from the condensate and the xylene-alcohol layer returned to the reaction mass. After the temperature of the mass reached 210° F., 4 parts of sodium dibutyl sulfosuccinate is added and the distillation is continued until the distilland is clear. The resin solids of the batch are thereafter increased by withdrawing the condensate from the vessel under reduced pressure until the solids become approximately 67%. Thereupon the heating is discontinued and the solids cut back with xylene to 50% solids.

A similar batch without the use of the sodium sulfosuccinate ester was made and was found to have less alkali resistance and to require a higher temperature to give equivalent hardness when formulated into an enamel similar to that described in Example II. When this resin was substituted for the MM 46 resin of Examples 5, 8, 11, 14 and 17 and then tested in the same manners, it was found that comparable properties resulted.

Example 21

Bis-triazine resin was prepared in the following manner:

(A) Preparation of

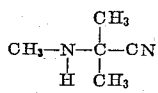

Over a period of two hours 132.2 parts of gaseous monomethylamine was added to 340.4 parts of acetone cyanohydrin. During the addition the temperature was kept in the range of −10° C. to +10° C. The reaction mixture was then stripped at room temperature and used in part B without further purification.

(B) Preparation of

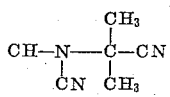

The crude aminonitrile as prepared in part A was mixed at 10° C. with 352 parts of benzene, 276.8 parts of anhydrous potassium carbonate, and 128 parts of water. There was then added at 15°–25° C. and over a period of 65 minutes 246 parts of cyanogen chloride. Stirring was continued for one-half hour at room temperature and the reaction mixture allowed to stand overnight. It was then heated to 50° C., cooled, the aqueous layer separated, and the benzene layer filtered, dried over anhydrous magnesium sulfate and distilled. There was obtained 213.5 parts of a light brown oil boiling at 89°–90° C. at 2 mm.

(C) Preparation of

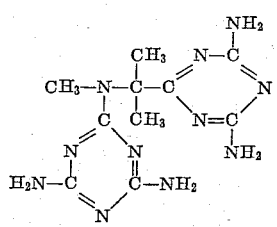

To a stirred mixture of 200 parts of isopropanol, 128.2 parts of the cyanoaminonitrile prepared in part B, and 193 parts of dicyanodiamide there was added at reflux (75°–85° C.) and over a period of 90 minutes a solution of 35 parts of 85% potassium hydroxide in 400 parts of isopropanol. The mixture was stirred at reflux for 20.5 hours and then cooled. The fine white solid which had formed was filtered off and washed with hot water. Two hundred twenty-six parts of the bis-(aminotriazine) was obtained. It melted at 430°–435° C.

Into a three-necked flask equipped with reflux condenser, mechanical agitator, thermometer, and water separator were charged 72.75 parts (0.25 mol) of the ditriazine, last above, 124.0 parts (1.5 mols of HCHO) of a solution of formaldehyde in n-butyl alcohol prepared from 49.6 parts of paraformaldehyde (91%) and 74.4 parts of n-butyl alcohol, 124.0 additional parts of n-butyl alcohol and 29.0 parts of xylol. The pH of the reaction mixture was 7.2–7.4 (bromothymol blue). The mixture was heated to reflux temperature (110° C.) and held at that temperature for 30 minutes. At this point the pH was lowered to 4.5–4.8 (bromocresol green) with 50% aqueous formic acid. Refluxing was resumed. The resin was refluxed under conditions of continuous removal of the aqueous phase forming in the separator. After one hour the resin was clear. After three and one-half hours a total of 21.0 parts of aqueous phase had separated. The resin was stripped to a calculated 70% solids. The batch temperature rose to 132° C. At this stage the resin was "swept" with 50.0 parts of butanol. The resin was then diluted with butanol, cooled, and filtered with filter aid. It had the following physical properties:

Solids _____ 61.4%.
Viscosity _____ 2.8 poises.
Mineral thinner tolerance _____ Infinite.
Isooctane tolerance _____ Infinite.
Acid number _____ 2.5.
Color (P. and V. scale) _____ 2.

When this resin was thinned with butanol to 60° solids and substituted for the MX 61 resin solution of Examples 6, 9, 13, 15 and 18 and then tested in the same manners, it was found that comparable properties resulted.

Examples 22 and 23

A gray pigment base (Base A) was formulated as follows:

| | Percent by wt. |
|---|---|
| Lampblack | Trace |
| TiO₂ pigment | 51.2 |
| Solution of oxidized copolymer oil [1] | 30.2 |
| Solvesso 150 | 18.6 |

[1] 80% butadiene-20% styrene, Na-polymerized oxidized to 12.6% oxygen while dissolved in equal parts Solvesso 100 and Solvesso 150 to 43% NVM; Solvesso 150 has a KB value of about 83, and a boiling range of 375° F.-410° F.

The foregoing materials were ground in a pebble mill for 24 hours at which time an enamel grind of No. 7 had been secured. The resulting base was blended with the following ingredients to form the enamels of Examples 22 and 23.

ENAMEL OF EXAMPLE 22

| | Percent by wt. |
|---|---|
| Base A above | 39.0 |
| Solution of oxidized copolymer oil used in Base A | 44.0 |
| Xylol | 7.0 |
| Urea resin solution of Ex. 19 concentrated to 50% NVM | 10.0 |

ENAMEL OF EXAMPLE 23

| | Percent by wt. |
|---|---|
| Base A above | 39.0 |
| Solution of oxidized copolymer oil used in Base A | 44.0 |
| Xylol | 8.0 |
| Melamine resin solution of Example 20 | 9.0 |

Films of the enamels of Examples 22 and 23 were applied to steel panels in film thicknesses of 0.7 mil, 1.0 mil, and 1.4–1.6 mils; some were baked 10 minutes at 350° F., others for 10 minutes at 410° F. The following properties were observed.

| Property | Film (mils) | Bake 10' at 350° F. | | Bake 10' at 410° F. | |
|---|---|---|---|---|---|
| | | Ex. 22 | Ex. 23 | Ex. 22 | Ex. 23 |
| Gloss | 1.0 | 96 | 93 | 70 | 89. |
| Hardness | 0.7 | H | H | 8H | 8H. |
| Do | 1.4–1.6 | H | H | 8H | 8H. |
| Reverse Impact | .5–.7 | P-10ip [1] | P-30ip | P-30ip | P-2ip. |
| Do | 1.4–1.6 | P-10ip | P-4ip | P-30ip | F-2ip.[1] |
| Color Retention | | Good | Excellent | Poor-Hazy | Fair. |
| Mar Resistance | | do | Good | Excellent | Superior. |
| Surface Hardness | | Fair | Fair | do | Do. |

[1] P=passed; F=failed; ip=inch lbs.; samples tested at progressively increased impact from 2–30 inch pounds until failure of film occurred.

By varying the baking times and temperatures, the noted properties can be varied widely.

Example 24

An enamel was formulated as shown below to provide a coating suitable for use as a protective coating on metal gaskets, such as head gaskets for automobile engines. The coating was applied to copper sheet and steel panels and was tested for durability by exposing to various materials with which gaskets are apt to come in contact in use or during installation. The films were baked 10 minutes at 415° F. prior to being tested and their film thicknesses were about 1.5 mils.

COATING FORMULATION

| | Percent by wt. |
|---|---|
| Solution of oxidized copolymer oil of Base A, Exs. 22 and 23 | 85 |
| Urea formaldehyde resin solution of Example 19 | 15 |

EXPOSURE TESTS

| | |
|---|---|
| Gasoline | Film intact after 48 hours. |
| Motor oil | Film intact after 48 hours. |
| 1% aq. alkali | Film intact after 48 hours. |
| Aq. 1 N HCl | Film intact after 48 hours. |
| 50% methanol-water solution at 180° F | Slight softening; film intact after 48 hours. |
| 50% ethylene glycol-water solution at 180° F | Slight softening; film intact after 48 hours. |

Example 25

A coating intended for use as a wire enamel was formulated as follows:

| | Percent | Solids only, weight percent |
|---|---|---|
| Solution of oxidized copolymer oil of Base A, Exs. 22–23 | 15 | 13.9 |
| Urea resin solution of Example 19 | 85 | 86.1 |
| | | 100.0 |

This composition was applied to No. 30 gauge copper wire in a conventional wire coating machine. The wire travelled 19 feet per minute through a 30 inch tower at 945° F. and a film thickness of about 1 mil was applied. The composition demonstrated good coating and application properties, and its mechanical and electrical properties compared favorably with oleoresinous wire coatings. Its solvent resistance and heat resistance excelled oleoresinous types of wire coatings.

Example 26

Polybutadiene drying oil was blown to an oxygen content of about 11% in xylol, the blown oil solution having a color of 1L–1, a viscosity of V–W (Gardner-Holdt), an acid number of 7.0, and an NVM of 36.4%. One mil films on tin plate were baked 11.5 minutes at 390° F. Tests of the resulting coated iron showed the film possessed good adhesion and flexibility since the films passed the 30 inch pound reverse impact test and the 1/16" mandrel bend test. Samples of the blown oil were blended with the urea resin solution of Example 19 in the proportions of 80% blown oil solids to 20% urea resin solids. The resulting blend as well as the blown polybutadiene oil were applied to tinplate for tests as sanitary coatings for cans, and were subjected to the pumpkin processing tests after being baked 10 minutes at 350° F. and 10 minutes at 410° F. While the blown polybutadiene oil films were unsatisfactory, the films of the blend thereof with urea resin were much better.

From the foregoing description and examples of our invention, which is a continuation-in-part of our application Serial No. 513,606, filed June 6, 1955, and entitled "Improved Blown Hydrocarbon Drying Oil and Process Therefor,' i't will be understood that the principles of the invention can be practiced in a wide variety of particular embodiments which a person skilled in the art can prepare and provide by exercising his skill in combination with the foregoing teachings while remaining within the scope of the following claims.

Having described the invention, what we claim is:

1. A homogeneous coating composition comprising as the essential vehicle thereof a compatible mixture containing about 15–30 parts of melamine-formaldehyde resin dissolved in from 85–70 parts of an alkali-metal catalyzed liquid polymer of a $C_4$–$C_6$ diolefin which has been blown with air in the presence of a hydrocarbon solvent until the oxygen content thereof is between 8 and 22%, said composition being further characterized in that it is capable of forming continuous homogeneous films upon baking.

2. A coating composition comprising as the essential vehicle thereof 100 parts of a mixture composed of not less than about 15 to not more than 86.1 parts of urea-formaldehyde resin dissolved in correspondingly, not more than about 85 and not less than 13.9 parts of a liquid polymer of a $C_4$–$C_6$ conjugated diolefin, said resin being prepared in the presence of metallic sodium catalyst; said polymer being air blown in a hydrocarbon solvent boiling up to 250° C. to incorporate not less than 6% and not more than 22% oxygen in its structure; said composition being homogeneous and being adaptable to provide continuous films upon baking.

3. A liquid coating composition comprising as its sole film-forming material a homogeneous organic solvent solution of a blend composed of (1) 15% up to 50% by weight of a heat-convertible, solvent soluble, alkali-condensed, acid-resinified film-forming condensation product of an aldehyde and at least one organic compound characterized by the presence therein of at least two amino groups, each of said amino groups being attached to a carbon atom having a double bond extending to another element of the compound selected from the group consisting of nitrogen, sulfur and oxygen, and (2) 50–85% by weight of an oily sodium-polymerized film-forming polymer (a) which contains in its chemical structure residues of 4–6 carbon conjugated diolefin in amount corresponding to 60–100% by weight calculated as conjugated diolefin, and residues of vinyl aromatic compound in amounts corresponding to 40–0% by weight, calculated as vinyl aromatic compounds, and (b) which has been oxidized subsequent to polymerization by blowing it with free-oxygen-containing gas at substantially atmospheric pressure and at temperatures between room temperature and about 280° F. while continuously maintaining it homogeneously dissolved in organic hydrocarbon solvent having a kauri butanol value of at least 40 until it has acquired a chemically-combined oxygen contnet of about 6–22% by weight; said oxidized polymer being compatible in solvent with the foregoing aldehyde-amine condensation products by reason of its said oxygen content; said vinyl aromatic compound in the oily polymer of (2) above being selected from the group consisting of styrene, the nuclearly-substituted methyl styrenes and nuclearly-substituted ethyl styrenes.

4. A coating composition as claimed in claim 3 wherein the oxygen content of the oxidized polymer is between about 8 and 18%.

5. A coating composition as claimed in claim 4 wherein the oily sodium-polymerized polymer is a copolymer of butadiene and styrene.

6. A coating composition as claimed in claim 5 wherein the aldehyde-amine condensation product amounts to 15–30% by weight on the total film-forming solids.

7. A coating composition as claimed in claim 6 wherein the condensation product of (1) is a urea-formaldehyde condensation product.

8. A coating composition as claimed in claim 6 wherein the condensation product of (1) is an aminotriazine-aldehyde condensation product.

9. A coating composition as claimed in claim 5 wherein the aldehyde-amine condensation product amounts to 15–20% by weight on the total film-forming solids.

References Cited in the file of this patent

UNITED STATES PATENTS

| | | |
|---|---|---|
| 2,364,172 | Stauffer | Dec. 5, 1944 |
| 2,447,772 | Rust | Aug. 24, 1948 |
| 2,467,233 | Rust | Apr. 12, 1949 |
| 2,625,523 | Garber et al. | Jan. 13, 1953 |
| 2,660,563 | Banes et al. | Nov. 24, 1953 |
| 2,674,586 | Welch | Apr. 6, 1954 |
| 2,701,780 | Nelson et al. | Feb. 8, 1955 |